(12) United States Patent
Jevans et al.

(10) Patent No.: US 12,026,789 B2
(45) Date of Patent: Jul. 2, 2024

(54) SYSTEMS AND METHODS OF FORENSIC ANALYSIS OF CRYPTOCURRENCY TRANSACTIONS

(71) Applicant: CipherTrace, Inc., Menlo Park, CA (US)

(72) Inventors: David Alexander Jevans, Menlo Park, CA (US); Shannon Holland, Los Gatos, CA (US)

(73) Assignee: CipherTrace, Inc., Menlo Park, CA (US)

( * ) Notice: Subject to any disclaimer, the term of this patent is extended or adjusted under 35 U.S.C. 154(b) by 0 days.

(21) Appl. No.: 17/666,398

(22) Filed: Feb. 7, 2022

(65) Prior Publication Data

US 2022/0253952 A1    Aug. 11, 2022

Related U.S. Application Data

(60) Provisional application No. 63/147,057, filed on Feb. 8, 2021.

(51) Int. Cl.
*G06Q 40/12* (2023.01)
*G06Q 20/06* (2012.01)
(Continued)

(52) U.S. Cl.
CPC .......... *G06Q 40/12* (2013.12); *G06Q 20/065* (2013.01); *G06Q 20/36* (2013.01); *G06Q 20/40* (2013.01)

(58) Field of Classification Search
CPC ...... G06Q 40/12; G06Q 20/065; G06Q 20/36; G06Q 20/40
See application file for complete search history.

(56) References Cited

U.S. PATENT DOCUMENTS 9,298,806 B1    3/2016    Vessenes et al.
9,635,000 B1    4/2017    Muftic
(Continued)

FOREIGN PATENT DOCUMENTS

CN    104320262 A    1/2015
EP    3884411 A1    9/2021
(Continued)

OTHER PUBLICATIONS

Liu, Xiao Fan, et al. "Knowledge discovery in cryptocurrency transactions: A survey." Ieee access 9 (2021): 37229-37254. (Year: 2021).*

(Continued)

*Primary Examiner* — Asfand M Sheikh
(74) *Attorney, Agent, or Firm* — Barta Jones, PLLC (57) ABSTRACT

Systems and methods of forensic analysis of cryptocurrency transactions are described herein. A method can include obtaining fiat-based transaction data from a bank account, identifying a purchase of a cryptocurrency from fiat-based transaction data and cryptocurrency exchange trade history data from a cryptocurrency exchange where the cryptocurrency was purchased, obtaining cryptocurrency-based transaction data that identifies downstream cryptocurrency transaction data where the cryptocurrency was transferred out of the cryptocurrency exchange; and scoring a user who purchased or used the cryptocurrency based on the fiat-based transaction data, the cryptocurrency exchange trade history data, and the cryptocurrency-based transaction data.

20 Claims, 4 Drawing Sheets

(51) Int. Cl.
  *G06Q 20/36* (2012.01)
  *G06Q 20/40* (2012.01)

(56) References Cited

U.S. PATENT DOCUMENTS

| | | | |
|---|---|---|---|
| 10,102,265 B1 | 10/2018 | Madisetti et al. | |
| 10,171,476 B2 | 1/2019 | Khan | |
| 10,891,694 B1 | 1/2021 | Leise et al. | |
| 11,206,137 B2 | 12/2021 | Yu et al. | |
| 11,251,937 B2 | 2/2022 | Jevans | |
| 2006/0184528 A1 | 8/2006 | Rodeh | |
| 2006/0248016 A1 | 11/2006 | Ginter et al. | |
| 2011/0251951 A1 | 10/2011 | Kolkowitz et al. | |
| 2012/0130853 A1 | 5/2012 | Petri | |
| 2013/0018796 A1 | 1/2013 | Kolhatkar et al. | |
| 2014/0047544 A1 | 2/2014 | Jakobsson | |
| 2015/0032625 A1 | 1/2015 | Dill et al. | |
| 2015/0318995 A1 | 11/2015 | Leggette et al. | |
| 2015/0332283 A1 | 11/2015 | Witchey | |
| 2015/0363769 A1 | 12/2015 | Ronca | |
| 2015/0381637 A1 | 12/2015 | Raff et al. | |
| 2016/0012465 A1 | 1/2016 | Sharp | |
| 2016/0071108 A1* | 3/2016 | Caldera | G06Q 20/065 705/75 |
| 2016/0217436 A1 | 7/2016 | Brama | |
| 2016/0261690 A1 | 9/2016 | Ford | |
| 2016/0283920 A1 | 9/2016 | Fisher et al. | |
| 2016/0283941 A1 | 9/2016 | Andrade | |
| 2016/0300227 A1 | 10/2016 | Subhedar et al. | |
| 2016/0300234 A1 | 10/2016 | Moss-Pultz et al. | |
| 2016/0330027 A1 | 11/2016 | Ebrahimi | |
| 2016/0342994 A1 | 11/2016 | Davis | |
| 2017/0005804 A1 | 1/2017 | Zinder | |
| 2017/0011460 A1 | 1/2017 | Molinari et al. | |
| 2017/0031676 A1 | 2/2017 | Cecchetti et al. | |
| 2017/0034197 A1 | 2/2017 | Daniel et al. | |
| 2017/0093830 A1 | 3/2017 | Wuehler | |
| 2017/0111175 A1 | 4/2017 | Oberhauser et al. | |
| 2017/0132620 A1 | 5/2017 | Miller et al. | |
| 2017/0132635 A1* | 5/2017 | Caldera | G06Q 20/065 |
| 2017/0132636 A1 | 5/2017 | Caldera | |
| 2017/0206604 A1 | 7/2017 | Al-Masoud | |
| 2017/0214701 A1 | 7/2017 | Hasan | |
| 2017/0236094 A1 | 8/2017 | Shah | |
| 2017/0250972 A1 | 8/2017 | Ronda et al. | |
| 2017/0270534 A1 | 9/2017 | Zoldi et al. | |
| 2017/0293669 A1 | 10/2017 | Madhavan et al. | |
| 2017/0316390 A1 | 11/2017 | Smith et al. | |
| 2017/0330180 A1 | 11/2017 | Song et al. | |
| 2017/0344988 A1 | 11/2017 | Cusden et al. | |
| 2017/0352116 A1 | 12/2017 | Pierce et al. | |
| 2017/0366348 A1 | 12/2017 | Weimer et al. | |
| 2018/0006826 A1 | 1/2018 | Smith et al. | |
| 2018/0018723 A1 | 1/2018 | Nagla et al. | |
| 2018/0039667 A1 | 2/2018 | Pierce et al. | |
| 2018/0082256 A1 | 3/2018 | Tummuru et al. | |
| 2018/0089256 A1 | 3/2018 | Wright, Sr. | |
| 2018/0109541 A1 | 4/2018 | Gleichauf | |
| 2018/0137306 A1 | 5/2018 | Brady et al. | |
| 2018/0183606 A1 | 6/2018 | High et al. | |
| 2018/0211038 A1 | 7/2018 | Breiman et al. | |
| 2018/0216946 A1* | 8/2018 | Gueye | G01C 21/3617 |
| 2018/0219671 A1 | 8/2018 | Velissarios et al. | |
| 2018/0234496 A1* | 8/2018 | Ratias | H04L 9/3239 |
| 2018/0240107 A1 | 8/2018 | Andrade | |
| 2018/0240112 A1* | 8/2018 | Castinado | H04L 9/3234 |
| 2018/0253702 A1 | 9/2018 | Dowding | |
| 2018/0276666 A1 | 9/2018 | Haldenby et al. | |
| 2018/0285879 A1 | 10/2018 | Gadnis et al. | |
| 2018/0285971 A1* | 10/2018 | Rosenoer | G06Q 40/03 |
| 2018/0330385 A1 | 11/2018 | Johnson et al. | |
| 2018/0331835 A1 | 11/2018 | Jackson | |
| 2019/0018888 A1 | 1/2019 | Madisetti et al. | |
| 2019/0043138 A1* | 2/2019 | Blake | G06Q 20/10 |
| 2019/0057362 A1 | 2/2019 | Wright | |
| 2019/0081961 A1 | 3/2019 | Bansal | |
| 2019/0130392 A1* | 5/2019 | Kale | H04L 9/0637 |
| 2019/0132350 A1 | 5/2019 | Smith et al. | |
| 2019/0156301 A1 | 5/2019 | Bentov et al. | |
| 2019/0164156 A1 | 5/2019 | Lindemann | |
| 2019/0196899 A1 | 6/2019 | Sylvester, II et al. | |
| 2019/0199535 A1 | 6/2019 | Falk | |
| 2019/0229892 A1 | 7/2019 | Jevans | |
| 2019/0245699 A1 | 8/2019 | Irwan et al. | |
| 2019/0279215 A1 | 9/2019 | Kuchar | |
| 2019/0303807 A1* | 10/2019 | Gueye | G01C 21/3679 |
| 2019/0354725 A1 | 11/2019 | Lowagie | |
| 2019/0364057 A1* | 11/2019 | Hazay | H04L 63/1416 |
| 2019/0370797 A1 | 12/2019 | Jevans et al. | |
| 2019/0386969 A1* | 12/2019 | Verzun | G06F 21/606 |
| 2020/0160344 A1* | 5/2020 | Jevans | G06Q 20/065 |
| 2020/0162485 A1 | 5/2020 | Jevans et al. | |
| 2020/0167779 A1 | 5/2020 | Carver et al. | |
| 2020/0351278 A9 | 11/2020 | Jevans et al. | |
| 2020/0387891 A1* | 12/2020 | Paschini | H04L 9/3239 |
| 2021/0006399 A1 | 1/2021 | Lee | |
| 2021/0056630 A1* | 2/2021 | Rechtschaffen | G06Q 20/0658 |
| 2021/0073913 A1* | 3/2021 | Ingargiola | G06Q 20/02 |
| 2021/0075592 A1 | 3/2021 | Zhuo | |
| 2021/0383395 A1* | 12/2021 | Galka | G06F 16/9024 |
| 2022/0051219 A1* | 2/2022 | Sells | G06N 20/20 |

FOREIGN PATENT DOCUMENTS

| | | | |
|---|---|---|---|
| EP | 3884441 | A1 | 9/2021 |
| GB | 2593647 | A1 | 9/2021 |
| GB | 2594396 | A1 | 10/2021 |
| WO | WO2019071458 | A1 | 4/2019 |
| WO | WO2019144042 | A1 | 7/2019 |
| WO | WO2019231772 | A1 | 12/2019 |
| WO | WO2020010279 | A1 | 1/2020 |
| WO | WO2020106638 | A1 | 5/2020 |
| WO | WO2020106639 | A1 | 5/2020 |

OTHER PUBLICATIONS

Nicholls, Jack, Aditya Kuppa, and Nhien-An Le-Khac. "Financial cybercrime: A comprehensive survey of deep learning approaches to tackle the evolving financial crime landscape." Ieee Access 9 (2021): 163965-163986. (Year: 2021).*

Biryukov, A., Khovratovich, D., and Pustogarov, I. Deanonymisation of clients in Bitcoin P2P network. In Proceedings of the 2014 ACM SIGSAC Conference on Computer and Communications Security (2014), ACM, pp. 15-29., 15 pages.

M. Fleder, M. S. Kester, S. Pillal, Bitcoin Transaction Graph Analysis, CoRR, vol. abs/1502.01657, 2015, [online] Available: http://arxiv.org/abs/1502.01657, 8 pages.

M. Moser, R. Bohme, D. Breuker, "An inquiry into money laundering tools in the Bitcoin ecosystem", IEEE eCrime Researchers Summit (eCRS), 2013, 14 pages.

S. Meiklejohn, M. Pomarole, G. Jordan, K. Levchenko, D. McCoy, G. M. Voelker, S. Savage, "A Fistful of Bitcoins: Characterizing Payments Among Men with No Names", IMC, 2013, 13 pages.

F. Reid and M. Harrigan, "An analysis of anonymity in the Bitcoin system," in Privacy, security, risk and trust (PASSAT), 2011 IEEE Third Internatiojn Conference on Social Computing (SOCIALCOM). IEEE, 2011, pp. 1318-1326.

"International Search Report" and "Written Opinion of the International Searching Authority," Patent Cooperation Treaty Application No. PCT/US2019/014346, dated Apr. 22, 2019, 6 pages.

"International Search Report" and "Written Opinion of the International Searching Authority," Patent Cooperation Treaty Application No. PCT/US2019/033399, dated Aug. 1, 2019, 8 pages.

Chaum, David Lee, "Computer Systems Established, Maintained, and Trusted by Mutually Suspicious Groups," Dissertation, Department of Computer Science, University of California, Berkeley, May 22, 1982, 96 pages.

"International Search Report" and "Written Opinion of the International Searching Authority," Patent Cooperation Treaty Application No. PCT/US2019/062047, dated Jan. 24, 2020, 13 pages.

(56) References Cited

OTHER PUBLICATIONS

"International Search Report" and "Written Opinion of the International Searching Authority," Patent Cooperation Treaty Application No. PCT/US2019/062049, dated Jan. 27, 2020, 10 pages,.

Kharraz Amin et al., "Cutting the Gordian Knot: A Look under the Hood of Ransomware Attacks"; International Conference on Detection of Intrusions and Malware, and Vulnerability Assessment, Jun. 23, 2015 [retrieved Jan. 5, 2020]; Retrieved from the internet: <http://193.55.114.1/docs/dimva15_ransomware.pdf>, 28 pages.

Ye et al., "Alt-Coin Traceability," May 18, 2020 [retrieved May 25, 2021]; Retrieved from the internet: <https://eprint.iacr.org/2020/593>, 24 pages.

Van Saberhagen, "CryptoNote v 2.0," Oct. 17, 2013 [retrieved May 25, 2021]; Retrieved from the internet: <https://www.google.com/url?sa=t&rct=j&q=&esrc=s&source=web&cd=&ved=2ahUKEwjKnqCY1eXwAhUFCjQIHXcOD_4QFjAAegQIAxAD&url=https%3A%2F%2Fbytecoin.org%2Fold%2Fwhitepaper.pdf&usg=AOvVaw2WPuLQEPBjsZIPvUdROfmW>, 20 pages.

Biryukov et al., "Deanonymisation of clients in Bitcoin P2P network," Jul. 5, 2014, [retrieved May 25, 2021]; Retrieved from the internet: <https://arxiv.org/abs/1405.74183>, 15 pages.

Fleder et al., "Bitcoin Transaction Graph Analysis," Feb. 5, 2015 [retrieved May 25, 2021]; Retrieved from the internet: <https://arxiv.org/abs/1502.01657>, 8 pages.

Möser et al., "An Inquiry into Money Laundering Tools in the Bitcoin Ecosystem," 2013 [retrieved May 25, 2021]; Retrieved from the internet: <https://www.google.com/url?sa=t&rct=j&q=&esrc=s&source=web&cd=&ved=2ahUKEwjbnrXL1uXwAhU3JjQIHZDLCv0QFjADegQICBAD&url=https%3A%2F%2Fmaltemoeser.de%2Fpaper%2Fmoney-laundering.pdf&usg=AOvVaw0ta6LuCqsYGaknzINjyRsD>, 14 pages.

Meiklejohn et al., "A Fistful of Bitcoins: Characterizing Payments Among Men with No Names," 2013 [retrieved May 25, 2021]; Retrieved from the internet: <https://www.google.com/url?sa=t&rct=j&q=&esrc=s&source=web&cd=&ved=2ahUKEwjahNq|1-XwAhUKGDQIHecoC_0QFjACegQIAxAD&url=https%3A%2F%2Fcseweb.ucsd.edu%2F~smeiklejohn%2Ffiles%2Fimc13.pdf&usg=AOvVaw19IMVZQrG6hey605n-ftFH>, 13 pages.

Reid et al., "An Analysis of Anonymity in the Bitcoin System," Jul. 22, 2011 [retrieved May 25, 2021]; Retrieved from the internet: <https://arxiv.org/abs/1107.4524>, 30 pages.

Welsh, Noel, "Bandit Algorithms ContinuedL UCB1," Nov. 9, 2010; 17 pages.

J2kun, "Optimism in the Face of Uncertainty: the UCB1 Algorithm," [online] Oct. 28, 2013 [retrieved Jun. 9, 2021]; Retrieved from the internet: <https://jeremykun.com/2013/10/28/optimism-in-the-face-of-uncertainty-the-ucb1-algorithm/>, 17 pages.

Prasad, Aditya, "Lessons From Implementing AlphaZero," [online] Jun. 5, 2018 [retrieved Jun. 9, 2021]; Retrieved from the internet: <https://medium.com/oracledevs/lessons-from-implementing-alphazero-7e36e9054191>, 4 pages.

Chaum, D., "Blind signatures for untraceable payments" in Chaum D., Rivest R.L., Sherman A.T. (eds) Advances in Cryptology Proceedings of Crypto 82, 1983, pp. 199-203.

\* cited by examiner

SYSTEMS AND METHODS OF FORENSIC ANALYSIS OF CRYPTOCURRENCY TRANSACTIONS

CROSS-REFERENCE TO RELATED APPLICATIONS

This application claims the benefit and priority of U.S. Provisional Application Ser. No. 63/147,057, filed on Feb. 8, 2021, which is hereby incorporated by reference herein in its entirety as if fully set forth herein.

FIELD OF THE PRESENT TECHNOLOGY

The present disclosure pertains to the technical field of blockchain and cryptocurrency, and more particularly, but not by limitation to system and methods of forensic analyses of cryptocurrency transactions and the correlation of the same with fiat currency transactions to prevent fraud and other misuses.

SUMMARY

According to some embodiments, the present disclosure is directed to a method comprising: obtaining fiat-based transaction data from a bank account; identifying a purchase of a cryptocurrency from fiat-based transaction data and cryptocurrency exchange trade history data from a cryptocurrency exchange where the cryptocurrency was purchased; obtaining cryptocurrency-based transaction data that identifies downstream cryptocurrency transaction data where the cryptocurrency was transferred out of the cryptocurrency exchange; and scoring a user who purchased or used the cryptocurrency based on the fiat-based transaction data, the cryptocurrency exchange trade history data, and the cryptocurrency-based transaction data. According to some embodiments, the present disclosure is directed to a method comprising: obtaining fiat-based transaction data from a financial service, cryptocurrency exchange trade history data from a cryptocurrency exchange (which can include any medium which allows for the purchase of cryptocurrency with fiat currency), and cryptocurrency-based transaction data that identifies downstream cryptocurrency transaction data where a cryptocurrency purchased on the cryptocurrency exchange with the fiat currency was transferred out of the cryptocurrency exchange to a blockchain; comparing the fiat-based transaction data with the cryptocurrency-based transaction data, and the cryptocurrency exchange trade history data to identify matches; identifying a user and one or more accounts associated with the matches; and assigning a risk score to the user based on analysis of the fiat-based transaction data, the cryptocurrency-based transaction data, and the cryptocurrency exchange trade history data.

According to some embodiments, the present disclosure is directed to a system comprising a processor; and a memory for storing instructions, the processor executing the instructions to obtain fiat-based transaction data from a bank account (or any other fiat-based transaction type such as wire transfer, credit card purchase, ACH, and the like), identify a purchase of a cryptocurrency from fiat-based transaction data and cryptocurrency exchange trade history data from a cryptocurrency exchange where the cryptocurrency was purchased, obtain cryptocurrency-based transaction data that identifies downstream cryptocurrency transaction data where the cryptocurrency was transferred out of the cryptocurrency exchange; and score a user who purchased or used the cryptocurrency based on the fiat-based transaction data, the cryptocurrency exchange trade history data, and the cryptocurrency-based transaction data.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Overview

The present disclosure pertains to systems and methods for forensically analyzing blockchain/cryptocurrency transactions in combination with fiat transactions to prevent or reduce fraud or other nefarious behavior(s). For context, many individuals and entities use various fiat currency payment systems to purchase or sell cryptocurrencies, virtual assets or digital assets (referred to in this disclosure as "cryptocurrencies" or "bitcoin", although the most general interpretation applying across many of these assets and currencies is intended for this application). It is important for financial services such as the banks, money service businesses, and other agencies and companies involved in these payments to be able to correlate these payments to the cryptocurrencies that are purchased or sold.

In general, this disclosure pertains to any fiat-based currency and/or mechanism/platform for buying cryptocurrency, as well as any mechanism or platform for buying, trading, and/or using cryptocurrency.

This correlation can be useful for a number of cases such as enforcing bans or restrictions on the purchase or sale of cryptocurrencies from a particular company or institution or using a particular payment type. For example, credit or debit card transactions, wire transfers, (automatic clearing house) ACH payments, (simplified employee pension) SEP payment, and the like—just to name a few. Correlations can be used to link fraudulent payments with cryptocurrency wallets or addresses or service providers.

Correlations can be used to identify cryptocurrency money service businesses and/or identify illicit or unregistered money service providers. Correlations can be used to detect fraudulent payments involving cryptocurrencies, as well as to detect users or customers who are using cryptocurrencies as a way to launder or move funds outside of the fiat payment systems.

Correlations can also be advantageous in complying with government regulations. In some embodiments, cryptocurrency purchases can be detected from fiat payment systems that are then used to purchase illicit goods or services, fund terrorists or extremists, launder money, evade currency reports, and so forth.

The systems and methods disclosed herein utilize linkages between fiat payments (for example credit and debit card transactions) and cryptocurrency purchases or sales, and to link them to likely cryptocurrency addresses, wallets and transactions, and then to use risk scoring methods to detect customers who may be involved in illicit transactions.

Example Embodiments

Figure 1:
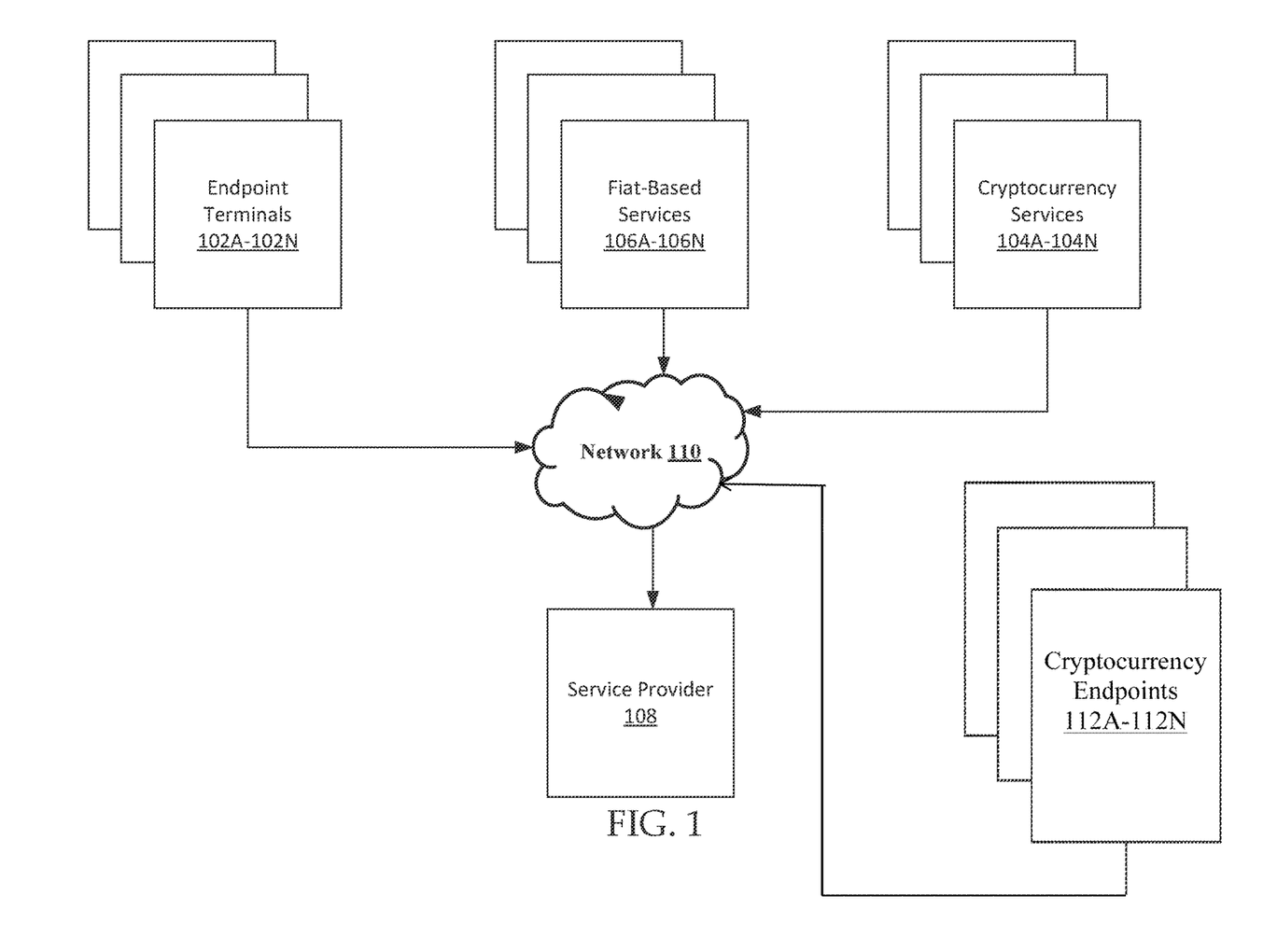
FIG. 1 is a schematic diagram of an example architecture where aspects of the present disclosure are practiced.

Turning now to the drawings, and to FIG. 1, which is a schematic diagram of an example architecture where aspects of the present disclosure can be practiced. The architecture can include endpoint terminals 102A-102N, cryptocurrency services 104A-104N, fiat-based financial services 106A-106N, a service provider 108, and a network 110. The network 110 can include an individual network or combinations of networks. For example, the network 110 may include any one or a combination of multiple different types of networks, such as cellular, cable, the Internet, wireless networks, and other private and/or public networks.

In general, the endpoint terminals 102A-102N are computing devices used by individuals or entities who perform fiat transactions and cryptocurrency transactions. The cryptocurrency services 104A-104N include cryptocurrency exchanges or other services that allow end users to buy, sell, trade, and otherwise transact cryptocurrencies. Users can maintain cryptocurrency addresses, wallets (clusters of addresses controlled by an individual or an organization), and the like.

The architecture can also comprise cryptocurrency endpoints 112A-112N such as wallets, websites, or other locations where cryptocurrency that is purchased on one of the cryptocurrency services 104A-104N is moved off exchange. The service provider 108 can identify illicit or illegal activity where a user has transferred cryptocurrency from their cryptocurrency endpoint to a malicious recipient, such as the dark web.

The service provider 108 enables forensic analyses of input of data collected from endpoint terminals 102A-102N, cryptocurrency services 104A-104N, fiat-based financial services 106A-106N, and cryptocurrency endpoints 112A-112N. The service provider 108 provides a means to correlate credit and debit card and other payments, such as wire transfers, ACH, SEP, and the like transactions to cryptocurrency addresses across various cryptocurrencies and various exchanges or other cryptocurrency providers (broadly referred to as cryptocurrency services).

It will be understood that the service provider 108 can track three types of data. A first type of data can include fiat-based transaction data (obtained from the fiat-based services 106A-106N) which can be obtained, for example from a bank. A second type of data can include cryptocurrency exchange trade history data (obtained from the cryptocurrency services 104A-104N) that includes data obtained from a cryptocurrency exchange. For example, a user can buy cryptocurrency and exchange one cryptocurrency for another on the exchange. A third type of data can include cryptocurrency-based transaction data (obtained from the cryptocurrency endpoints 112A-112N). This can include any type of transaction data where cryptocurrency that was purchased on an exchange is moved off the exchange. The cryptocurrency can be recorded in a blockchain ledger and used to purchase goods or services.

The service provider 108 can be configured to generate and provide confidence scores related to matching fiat-based transaction data to blockchain-based transaction data. Generally, a fiat-based transaction involves any legacy financial transaction that is not per se blockchain-based. In some embodiments, the service provider 108 can correlate risk between cryptocurrency addresses and credit and debit cardholders and addresses. The service provider 108 can use risk scores and other historical information about cryptocurrency addresses, wallets (e.g., clusters of addresses controlled by an individual or an organization), and counterparties to provide risk information that can be correlated with the fiat payment information, such as name and credit card number, although other types of personally identifiable information can also be used.

The service provider 108 can be configured to obtain cryptocurrency exchange trade history data from various sources, including from legacy or fiat-based services, such as banks and correlate such information to a cryptocurrency address using trading information obtained from cryptocurrency exchanges or other providers of transaction services and data feeds. For example, when a consumer purchases cryptocurrency using a legacy or fiat-based currency, the transaction details of that purchase can be used. In one example, a consumer purchases Bitcoin using an ACH transfer from a bank account. The transaction data where the Bitcoin is purchased can be used by the service provider 108 in correlations. In this example, data that can be gleaned can include bank account number, account balance or ledger information, as well as personal information of the account holder. To be sure, transaction history data for that particular account can also be used, not just transaction data for that account that relates to the particular cryptocurrency purchase. Mining these data can identify other debits/credits into the account from other cryptocurrency transactions, and so forth. Fiat-based transaction data from the account may also be evaluated. When the bank account is linked to other bank accounts, the service provider 108 may be permitted to obtain transaction data from the other linked accounts as well.

Additionally, the service provider 108 may correlate the fiat-based transaction data with the cryptocurrency exchange trade history data, along with cryptocurrency-based transaction data that identifies downstream cryptocurrency transaction data where the cryptocurrency was transferred out of the cryptocurrency exchange. In general, the cryptocurrency-based transaction data is created any time a crypto currency is moved from the exchange to an external location, such as a private wallet or crypto currency service. In one example, the crypto currency is moved to a wallet and that crypto currency can be used for illicit or illegal purchases.

In some embodiments, the service provider 108 can use fiat payment purchase information which is then correlated to market trading data to obtain likely matches (as well as downstream cryptocurrency-based transaction data). Matches can be based on time, amount, trading spread, and market particular fees to estimate the amount of cryptocurrency purchased that correlate to the fiat payment. Taking the estimated cryptocurrency amount and looking for transactions on various blockchains (for example Bitcoin and Ethereum) and looking within a time window for outbound transactions that match this amount. In one example, transaction matches can be searched over a threshold time frame, such as zero to three days, however, this threshold time frame can be adjusted as desired.

In one embodiment, the service provider 108 can be configured to adjust the outbound transaction amount for matching to take into account Bitcoin mining fees, Ethereum gas fees, or other cryptocurrency fees. For example, the outbound transactions may not exactly match the cryptocurrency values due to ancillary fees paid by the purchaser of the cryptocurrency. Thus, the cryptocurrency value for a purchase might be lower than the outbound transaction amount, which can be accounted for by the service provider 108 applying typical ancillary fees. The particulars of the ancillary fees are typically known quantities and are set by the cryptocurrency service. Knowing the cryptocurrency services and their fees, the service provider 108 can calculate various potential cryptocurrency values and detect matches with these potential values.

In some embodiments, the service provider 108 can create a matching window around the fee matching and time of the transaction. The service provider 108 can selectively shrink or grow the bounds of the matching time window. One example includes matching cryptocurrency transactions of a specified value range 24 hours after a fiat transaction, three days, or the like. The service provider 108 can also selectively adjust bounds around bounds on the cryptocurrency value to be wider or tighter based on currency price fluctuations, latency in purchasing different cryptocurrencies, different fee structures on purchasing different cryptocurrencies, and blockchain transaction fees—just to name a few.

In some embodiments, the service provider 108 can perform time-based analysis of fiat transactions that result in aggregation of funds into a cryptocurrency wallet or address and then perform the transaction analysis. In one non-limiting example, the service provider 108 can determine from transaction data that a customer purchased $100 of Bitcoin per day. After three days the customer sends $300 (+/−fees and spreads) in equivalent cryptocurrency via a blockchain transaction. The service provider 108 can apply limits and thresholds related to transmission fees. For example, if fees are 1%, then the service provider 108 queries transaction data from one or more of the cryptocurrency services 104A-104N for cryptocurrency transactions that match $300-$297 as converted into Bitcoin at the time of purchase.

In various embodiments, the service provider 108 can be configured to perform a time-based analysis of fiat transactions to cryptocurrency transactions such as when the purchaser performs multiple payments to purchase cryptocurrencies or their derivatives using fiat payments. The service provider 108 can calculate a risk of that customer based on the number of transactions and frequency of those transactions into cryptocurrency. In various embodiments, the service provider 108 can assign a risk score to a customer on a fiat side of a transaction and use that score that to improve filtering and risk scoring at the issuing and acquiring bank.

In one embodiment, the service provider 108 can be configured to detect and aggregate transactions where a user withdraws from their cryptocurrency wallet using multiple, small transactions. For example, a user may withdraw $1,000 of Bitcoin over a period of days in small increments that total up to all of a portion of the $1,000 of Bitcoin.

The service provider 108 can utilize historical and real-time trading data (e.g., USD to Bitcoin) and order book and trade data to create source input that can be used to fine-tune the USD to Bitcoin trade information. This analysis provides advanced detail on the actual Bitcoin that is used to trace the transaction.

As noted above, the service provider 108 can utilize addresses found during transaction analysis to find other addresses and wallets in use by that user to create a larger risk profile for the user. The service provider can aggregate risk across all or a portion of the addresses belonging to the user and the cryptocurrency addresses associated with the user (such as their deposit addresses at exchanges).

In some embodiments, the service provider 108 is configured to use risk scores of cryptocurrency addresses, wallets hosted and un-hosted addresses, counterparty risk scores, sanctioned information, theft information, and the like to propagate risk back to an identified fiat customer.

In one example use case, the service provider 108 evaluates data that was provided by one of the fiat-based financial services 106A-106N such as a credit card company. The credit card company provides data on fiat currency used to buy cryptocurrency on a target cryptocurrency exchange.

In this example, the service provider 108 is configured to focus on transactions through the target cryptocurrency exchange, and only on Bitcoin transactions. During the analysis target cryptocurrency exchange detects potential transaction matches where customers are using credit card companies to purchase cryptocurrency and are sending funds to gambling sites; foreign exchanges; dark markets; money laundering mixers; and financial crime credit card dump sites.

The service provider 108 reduces the transaction set to meaningful transactions and removes account creation authorization transactions. The service provider 108 applies a threshold to reduce the set of transactions to those above $1,500). The service provider 108 correlates six percent of identified credit card company transactions to cryptocurrency addresses. The service provider 108 identifies transactions linked to gambling and dark market (drug trafficking) transactions. The service provider 108 can thus infer that between 20-30% of credit card company transactions can be linked to cryptocurrency transactions.

The service provider 108 can improve the accuracy and scope of these analyses using time-based and multi-transaction analysis. The service provider 108 can cluster multiple purchases to a single outgoing transaction. For example, a customer can be identified as having purchased Bitcoin three times on a particular credit card. The Bitcoin is then moved into one blockchain transaction. The service provider 108 can match cryptocurrency purchases that are broken up into many smaller purchases by the exchange.

With respect to multiple currency analyses, the service provider 108 can group and cluster transactions, as well as perform risk-based analysis of transactions. That is, the service provider 108 can be configured to focus on risky cryptocurrency transactions that are linked to credit card company payments).

According to some embodiments, the service provider 108 can be configured to detect variations "normal" behavior in any of the fiat-based transaction data, the cryptocurrency-based transaction data, the cryptocurrency exchange trade history data, and/or combinations thereof.

For example, the service provider 108 can detect unusual credit card/ACH activity (a large uptick for example) at a cryptocurrency exchange. The service provider 108 might also identify a correlating bump in purchases and/or transactions out of the exchange (e.g., in cryptocurrency-based transaction data). While an explicit match may not be evidence in an actual transaction, the service provider 108 can infer information from these data. For example, an increase of credit card purchases at a cryptocurrency exchange could be correlated with an increase of crypto transactions moving a cryptocurrency from the cryptocurrency exchange to a dark market. This is merely an example of how behavioral data from a cryptocurrency exchange and/or a bank or off-exchange cryptocurrency destination can be correlated rather than using explicit transactions tied to a distinct individual or account holder. These types of analysis can be used to identify coordinated fraud by a plurality of users, even when these users may be located across the world.

Figure 2:
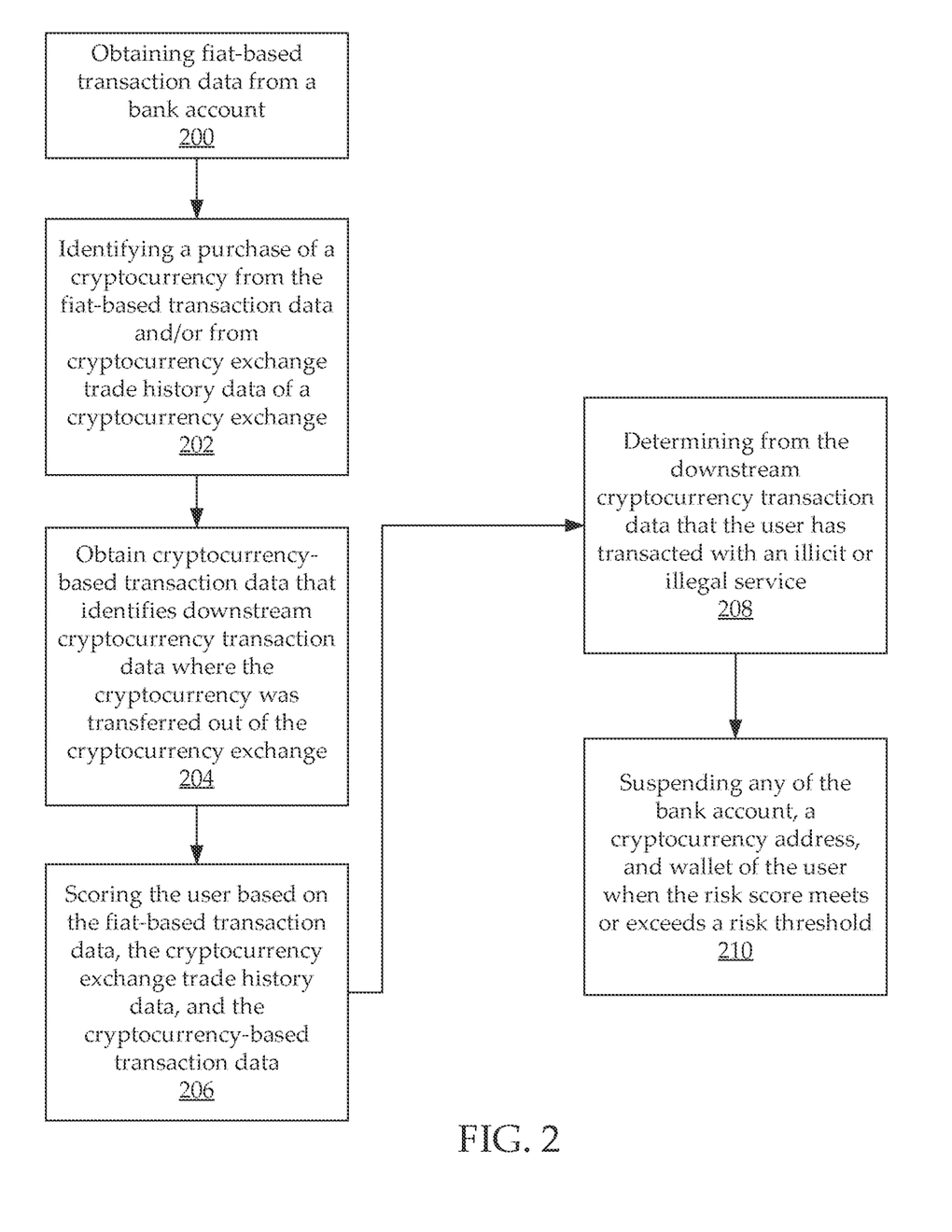
FIG. 2 is a flowchart of an example method of the present disclosure.

FIG. 2 is a flowchart of an example method. The method generally involves identifying a cryptocurrency purchase from fiat-transaction data and cryptocurrency exchange trade history data, and using that information as a jumping-off point to identify how the user used that cryptocurrency. The user can be scored according to their risk, which is a function how the user used the cryptocurrency.

The method can initially include a step 200 of obtaining fiat-based transaction data from a bank account. The method can include a step 202 of identifying a purchase of a cryptocurrency from the fiat-based transaction data and from cryptocurrency exchange trade history data of a cryptocurrency exchange. In some instances, the purchase of a cryptocurrency can be identified from only the fiat-based transaction data. For example, a user may buy Bitcoin using their credit card. The Bitcoin purchase can be identified by evaluating transactional data from the credit card account of the user. The transactional data may identify transaction parameters such as the cryptocurrency exchange name, the wallet or cryptocurrency address where the cryptocurrency was deposited, the time the cryptocurrency was purchased, and so forth. Details regarding the owner of the bank account can also be identified, such as name, address, credit card number, and so forth.

Once the fiat-based transaction data has been obtained and assessed along with the cryptocurrency exchange trade history data, the method can include a step 204 of obtaining cryptocurrency-based transaction data that identifies downstream cryptocurrency transaction data where the cryptocurrency was transferred out of the cryptocurrency exchange. This can involve determining downstream cryptocurrency use where the cryptocurrency was used when transferred off the cryptocurrency exchange. For example, the user can utilize the cryptocurrency in acceptable or unacceptable (e.g., illegal or illicit) ways. The method can include a step 206 of scoring the user based on the fiat-based transaction data, the cryptocurrency exchange trade history data, and the cryptocurrency-based transaction data The scoring indicates whether the user is a risk to the financial institution (fiat-based and/or crypto-based). It will be understood that the cryptocurrency exchange trade history data can be analyzed in combination with the downstream cryptocurrency transaction data (e.g., cryptocurrency-based transaction data).

In some embodiments, the method can include a step 208 of determining from the downstream cryptocurrency transaction data that the user has transacted with any one or more of a gambling websites, a foreign exchange, a dark market, money laundering mixer, and/or financial crime credit card dump website. To be sure, these are examples of illicit or illegal behavior by the user. The method then includes a step 210 of suspending any of the bank account, a cryptocurrency address, and wallet of the user when the risk score meets or exceeds a risk threshold. In some instances, the risk score can be calculated by assigning values to transactions/behaviors. Some behaviors can be weighted differently. For example, transactions involving the dark web may be weighted heavier than transactions occurring on a gambling website. The aggregate score provides an indication as to how risky the user is. In some embodiments, when certain types of transactions are identified, the transactions of the user may be automatically referred to law enforcement review.

Figure 3:
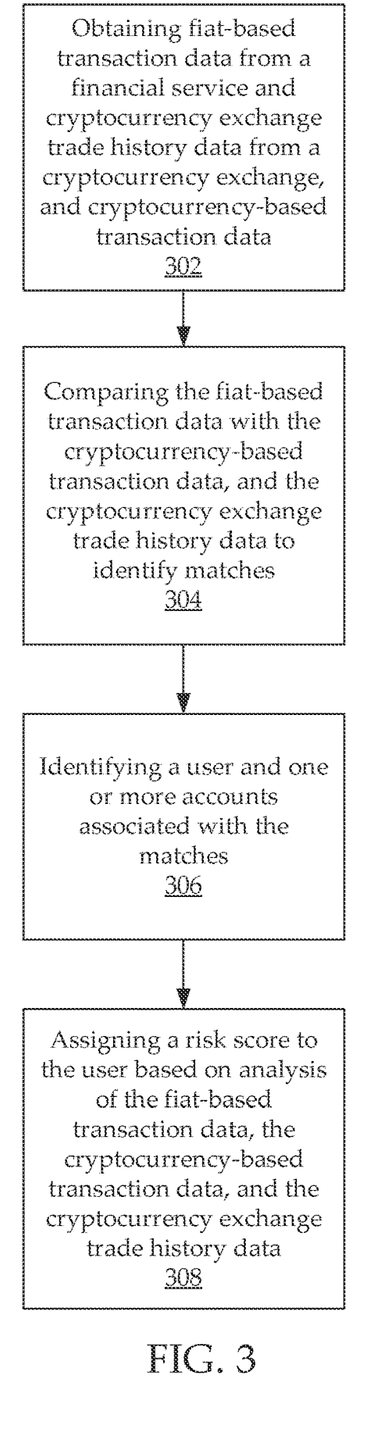
FIG. 3 is a flowchart of another example method of the present disclosure.

FIG. 3 is a flowchart of another example method. The method generally includes determining correlations between fiat-based transaction data and cryptocurrency-based transaction data and identifying the user or users associated with those matching transactions. The method can include a step 302 of obtaining fiat-based transaction data from a financial service and cryptocurrency exchange trade history data from a cryptocurrency exchange, and cryptocurrency-based transaction data. The cryptocurrency exchange trade history data includes cryptocurrency address and wallet data obtained from a cryptocurrency exchange. The fiat-based transaction data includes credit payments, debit payments, automatic clearing house payments, wire payments, and the like. The cryptocurrency-based transaction data identifies downstream cryptocurrency transaction data where a cryptocurrency purchased on the cryptocurrency exchange with the fiat currency was transferred out of the cryptocurrency exchange to a blockchain The method can include a step 304 of comparing the fiat-based transaction data with the cryptocurrency-based transaction data, and the cryptocurrency exchange trade history data to identify matches. The method further includes a step 306 of identifying a user and one or more accounts associated with the matches. The method can include a step 308 of assigning a risk score to the user based on analysis of the fiat-based transaction data, the cryptocurrency-based transaction data, and the cryptocurrency exchange trade history data.

Figure 4:
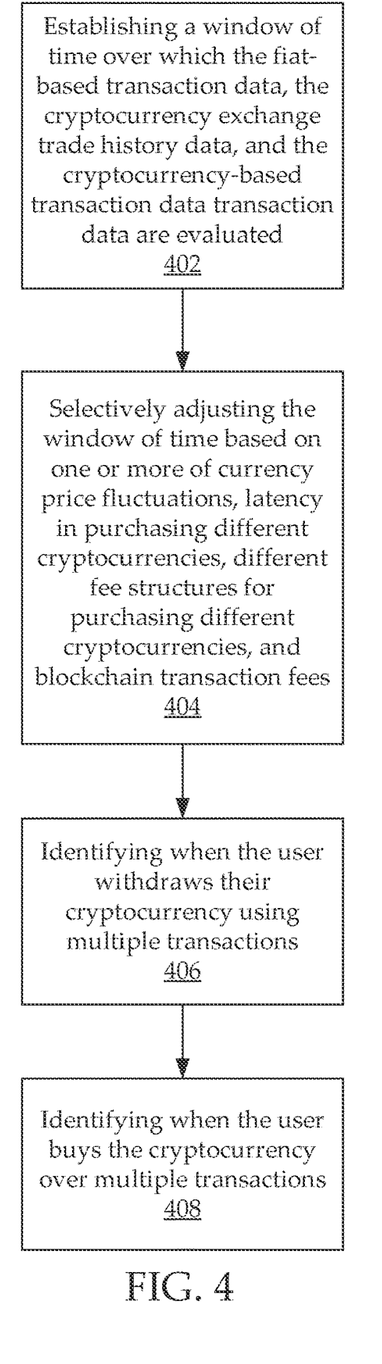
FIG. 4 is a flowchart of an additional example method of the present disclosure.

FIG. 4 is another flowchart of an example method. The method can include a step 402 of establishing a window of time over which the fiat-based transaction data, the cryptocurrency exchange trade history data, and the cryptocurrency-based transaction data transaction data are evaluated. For example, a window of time, such as prior two days, can be used to partition or reduce the volume of data being analyzed. Once a transaction of interest has been identified, it is advantageous to limit the window's size to periods of time that are relatively close to the date identified for the transaction of interest. Only fiat and crypto transactions occurring in the window around the date of the transaction of interest can be evaluated, in some embodiments.

Next, the method can include a step 404 of selectively adjusting the window of time-based on one or more of currency price fluctuations, latency in purchasing different cryptocurrencies, different fee structures for purchasing different cryptocurrencies, and blockchain transaction fees. The method can also include a step 406 of identifying when the user withdraws their cryptocurrency using multiple transactions, and a step 408 of identifying when the user buys the cryptocurrency over multiple transactions. These data can be identified either from cryptocurrency-based transaction data and/or cryptocurrency exchange trade history data.

Figure 5:
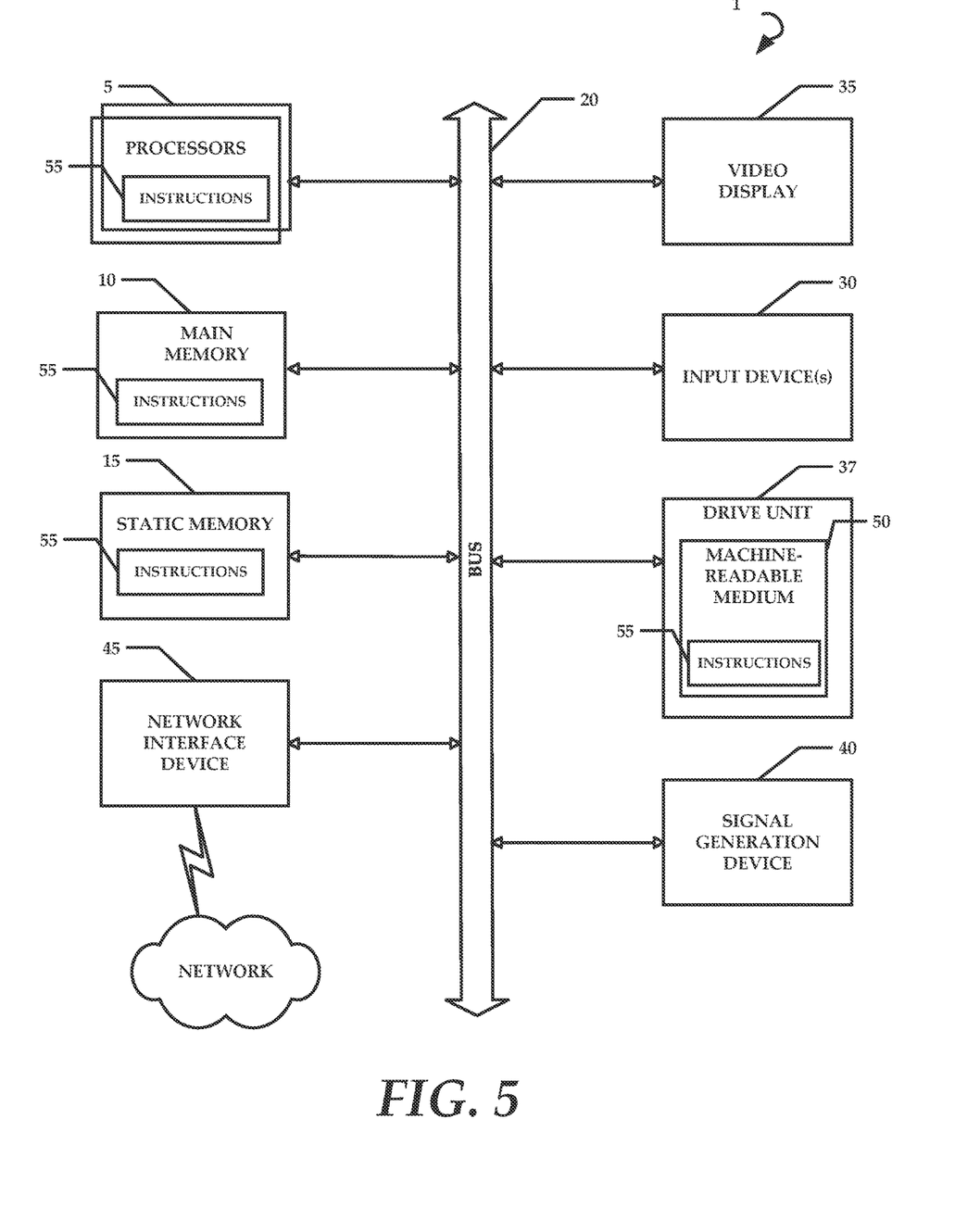
FIG. 5 is a schematic diagram of an exemplary computer system that is used to implement embodiments according to the present technology.

FIG. 5 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be an Internet-of-Things device or system, a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

The components provided in the computer system 1 are those typically found in computer systems that may be suitable for use with embodiments of the present disclosure and are intended to represent a broad category of such computer components that are well known in the art. Thus, the computer system 1 can be an Internet-of-Things device or system, a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computer system 1 may be implemented as a cloud-based computing environment, such as a virtual machine operating within a computing cloud. In other embodiments, the computer system 1 may itself include a cloud-based computing environment, where the functionalities of the computer system 1 are executed in a distributed fashion. Thus, the computer system 1, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer device 1, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications, as well as wireless communications (both short-range and long-range). Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method performed by service provider using a virtual machine (VM) in a cloud computing system, the method comprising:

obtaining by the service provider, via a network, fiat-based transaction data from a plurality of bank accounts, the network being a combination of a cellular network and the Internet;

identifying, by the service provider, a plurality of purchases of cryptocurrency from the fiat-based transaction data and obtaining cryptocurrency exchange trade history data and real-time trading data from a plurality of cryptocurrency exchanges where the cryptocurrency was purchased, wherein the cryptocurrency is recorded in a blockchain ledger;

selectively obtaining by the service provider, from a plurality of cryptocurrency endpoints via the network, first blockchain-based transaction data associated with the cryptocurrency recorded in the blockchain ledger within a time window around a fiat-based transaction time, the time window being selectively expanded or shrunk, the first blockchain-based transaction data being created when the cryptocurrency is transferred out of the plurality of cryptocurrency exchanges to a blockchain associated with the plurality of cryptocurrency endpoints;

analyzing, by the service provider, the first blockchain-based transaction data;

based on the analyzing, determining that there is an increase in the first blockchain-based transaction data;

based on the determination, identifying downstream cryptocurrency use where the cryptocurrency was used;

identifying, by the service provider, a plurality of users who purchased or used the cryptocurrency downstream, based on the fiat-based transaction data, the cryptocurrency exchange trade history data, the real-time trading data and the first blockchain-based transaction data;

assigning a value to each transaction performed by each of the plurality of users;

aggregating the assigned values for each of the plurality of users to generate an aggregated value for each of the plurality of users;
comparing the aggregated value for each of the plurality of users to a threshold to determine a subset of the plurality of users with the aggregated value exceeding the threshold; and
based on the aggregated value exceeding the threshold, identifying by the service provider, the subset of the plurality of users as involved in coordinated fraudulent activities.

2. The method according to claim 1, further comprising:
comparing the fiat-based transaction data with the first blockchain-based transaction data to identify matches between the fiat-based transaction data and the first blockchain-based transaction data; and
identifying the subset of the plurality of users and one or more accounts associated with the matches of the fiat-based transaction data and the first blockchain-based transaction data, the fiat-based transaction data being obtained from the one or more accounts.

3. The method according to claim 1, wherein a workload on the cloud computing system varies in real-time and managed by a plurality of servers in real-time.

4. The method according to claim 1, wherein the first blockchain-based transaction data is created after the cryptocurrency is moved from a cryptocurrency exchange to a private wallet.

5. The method according to claim 1, further comprising determining from the first blockchain-based transaction data that the subset of the plurality of users has transacted with one or more of: a gambling website, a dark market, a money laundering mixer, and a financial crime credit card dump website.

6. The method according to claim 1, further comprising establishing a window of time over which the fiat-based transaction data, the cryptocurrency exchange trade history data, and the first blockchain-based transaction data are evaluated.

7. The method according to claim 1, wherein the time window around the fiat-based transaction time comprises a specified time range after a fiat-based transaction.

8. The method according to claim 1, further comprising suspending one or more of: a bank account, a cryptocurrency address, and a wallet of a user of the plurality of users when a risk score for the user meets or exceeds a risk threshold.

9. The method according to claim 1, further comprising:
calculating an aggregate risk score of a user by assigning values to behaviors of the plurality of users; and
calculating an aggregate score for the user by weighting the behaviors of the plurality of users differently, the aggregate score providing an indication of riskiness of the user.

10. A non-transitory computer-readable medium storing instructions, that when executed by a processor, cause the processor to perform operations comprising:
obtaining, by the processor, via a network, fiat-based transaction data from a plurality of bank accounts, the network being a combination of a cellular network and the Internet;
identifying, by the processor, a plurality of purchases of cryptocurrency from the fiat-based transaction data;
obtaining cryptocurrency exchange trade history data and real-time trading data from a plurality of cryptocurrency exchanges where the cryptocurrency was purchased, wherein the cryptocurrency is recorded in a blockchain ledger;
selectively obtaining, from a plurality of cryptocurrency endpoints via the network, first blockchain-based transaction data associated with the cryptocurrency recorded in the blockchain ledger within a time window around a fiat-based transaction time, the time window being selectively expanded or shrunk, the first blockchain-based transaction data being created when the cryptocurrency is transferred out of the plurality of cryptocurrency exchanges to a blockchain associated with the plurality of cryptocurrency endpoints;
analyzing, by the processor, the first blockchain-based transaction data associated with the cryptocurrency recorded in the blockchain ledger;
based on the analysis, determining that there is an increase in the first blockchain-based transaction data;
based on the determination, identifying downstream cryptocurrency use where the cryptocurrency purchased on at least one of plurality of the cryptocurrency exchanges with fiat currency was used;
identifying, by the processor, a plurality of users who used the cryptocurrency downstream, based on the fiat-based transaction data, the first blockchain-based transaction data, the real-time trading data, and the cryptocurrency exchange trade history data;
assigning a value to each transaction performed by each user of the plurality of users;
aggregating the assigned values for each of the plurality of users to generate an aggregated value for each of the plurality of users;
comparing the aggregated value for each of the plurality of users to a threshold to determine a subset of the plurality of users with the aggregated value exceeding the threshold; and
based on the aggregated value exceeding the threshold, identifying by the processor the subset of the plurality of the users as involved in coordinated fraudulent activities.

11. The non-transitory computer-readable medium of claim 10, wherein the instructions further cause the processor to perform operations comprising:
utilizing real-time trading data associating an amount to the cryptocurrency to create a source input; and
based on the created source input, fine-tuning the association of the amount to the cryptocurrency.

12. The non-transitory computer-readable medium of claim 10, wherein the fiat-based transaction data includes credit payments, debit payments, automatic clearing house payments, wire payments, and permutations thereof.

13. The non-transitory computer-readable medium of claim 10, wherein the instructions further cause the processor to perform operations comprising:
determining from the first blockchain-based transaction data that the subset of the plurality of users has transacted with one or more of: a gambling website, a dark market, a money laundering mixer, and a financial crime credit card dump website.

14. The non-transitory computer-readable medium of claim 10, wherein the instructions further cause the processor to perform operations comprising:
establishing a window of time over which the fiat-based transaction data, the first blockchain-based transaction data, and the cryptocurrency exchange trade history data are evaluated.

15. The non-transitory computer-readable medium of claim 14, wherein the instructions further cause the processor to perform operations comprising:

selectively adjusting the window of time based on one or more of: currency price fluctuations, latency in purchasing different cryptocurrencies, different fee structures for purchasing different cryptocurrencies, and blockchain transaction fees.

16. The non-transitory computer-readable medium of claim 10, wherein the instructions further cause the processor to perform operations comprising:
suspending one or more of: a bank account, a cryptocurrency address, and a wallet of the subset of the plurality of the users.

17. The non-transitory computer-readable medium of claim 10, wherein the instructions further cause the processor to perform operations comprising:
identifying when:
a user withdraws the cryptocurrency using multiple transactions; or
the user buys the cryptocurrency over multiple transactions.

18. A cloud computing system comprising:
a processor; and
a memory for storing instructions, the processor executing the instructions to cause a service provider to:
obtain, via a network, fiat-based transaction data from a plurality of bank accounts, the network being a combination of a cellular network and the Internet;
identify a plurality of purchases of a cryptocurrency from the fiat-based transaction data;
obtain cryptocurrency exchange trade history data and real-time trading data from a plurality of cryptocurrency exchanges where the cryptocurrency was purchased, wherein the cryptocurrency is recorded in a blockchain ledger;
selectively obtain, from a plurality of cryptocurrency endpoints via the network, first blockchain-based transaction data, associated with the cryptocurrency recorded in the blockchain ledger within a time window around a fiat-based transaction time, the time window being selectively expanded or shrunk, the first blockchain-based transaction data being created when the cryptocurrency is transferred out of the plurality of cryptocurrency exchanges to a blockchain associated with the plurality of cryptocurrency endpoints;
analyze the first blockchain-based transaction data associated with the cryptocurrency recorded in the blockchain ledger;
based on the analysis, determine that there is an increase in the first blockchain-based transaction data;
based on the determination, identify downstream cryptocurrency use where the cryptocurrency was used;
identify a plurality of users who used the cryptocurrency downstream, based on the fiat-based transaction data, the cryptocurrency exchange trade history data, the real-time trading data, and the first blockchain-based transaction data;
assign a value to each transaction performed by each of the plurality of users;
aggregate the assigned values for each of the plurality of users to generate an aggregated value for each of the plurality of users;
compare the aggregated value for each of the plurality of users to a threshold to determine a subset of the plurality of users with the aggregated value exceeding the threshold; and
based on the aggregated value exceeding the threshold, identify the subset of users as involved in coordinated fraudulent activities.

19. The cloud computing system according to claim 18, wherein the cryptocurrency exchange trade history data includes cryptocurrency address and wallet data obtained from the at least one of the plurality of cryptocurrency exchanges, and the fiat-based transaction data includes one or more of: credit payments, debit payments, automatic clearing house payments, wire payments, and permutations thereof.

20. The cloud computing system according to claim 18, wherein the processor further executes the instructions to cause a service provider to: determine from the first blockchain-based transaction data that the subset of the plurality of the users, has transacted with one or more of: a gambling web site, a dark market, a money laundering mixer, and a financial crime credit card dump website; and suspend one or more of: a bank account, a cryptocurrency address, and a wallet of the subset of the plurality of users.

* * * * *